United States Patent Office 3,471,256
Patented Oct. 7, 1969

3,471,256
PREPARATION OF AMMONIA AND HYDROCHLORIC ACID FROM AMMONIUM CHLORIDE
Roger Botton, Paris, and Andre Steinmetz, Aubervilliers, France, assignors to Produits Chimiques Pechiney-Saint-Gobain, Paris, France
No Drawing. Filed June 14, 1966, Ser. No. 557,384
Claims priority, application France, June 17, 1965, 21,156
Int. Cl. C01b 7/08; C01c 1/02
U.S. Cl. 23—154          15 Claims

ABSTRACT OF THE DISCLOSURE

Method and composition for preparation of $NH_3$ and HCl from $NH_4Cl$, wherein $NH_4Cl$ is contacted with a fixative mass consisting essentially of partially reduced iron oxide and an alkali metal chloride, at about 400°–450° C., collecting the released $NH_3$, then reacting the iron in the fixative mass with an oxidizing gas such as air, introducing water vapor into the oxidized mass, recovering the released HCl, and regenerating the fixative mass with a reducing gas such as hydrogen or CO, to restore the mass essentially to its original condition. The fixative mass may be then recycled with a fresh charge of $NH_4Cl$. Recycling may be continued indefinitely. The method enables the recovery in respective and sequential steps, of up to 99% of the theoretically maximum yields of both $NH_3$ and HCl. Temperature is easily and precisely controllable and release of ammonia and hydrochloric acid is relatively rapid.

---

This invention contemplates the preparation of ammonia and hydrochloric acid from ammonium chloride, including a novel process and novel fixative mass. The preparation of ammonia and hydrochloric acid from ammonium chloride has been accomplished by putting ammonium chloride in contact with a solid mass essentially comprising magnesia, the hydrochloric acid of the ammonium chloride fixing itself on the magnesia and the ammonia of the ammonuim chloride being liberated and recovered. The temperature of the hydrochlorinated magnesium oxide is heated to elevated temperature while water vapor is passed through it, which decomposes the chlorinated mass and liberates the hydrochloric acid. That method has several imperfections which substantially reduce its commercial possibilities. In order to liberate the hydrochloric acid it is necessary to heat the chlorinated mass to a temperature as high as 800° C. and in addition to the difficulties inherent in the use of such high temperatures, the heating of the solid mass is accomplished through the walls of the reaction chamber, which poses extreme problems of heat transfer. Furthermore, when that method is applied it is difficult to set free the totality of the ammonia in the ammonium chloride because the liberation of hydrochloric acid begins before the ammonia is wholly freed.

It is an object of the present invention to prepare ammonia and hydrochloric acid from ammonium chloride with improved yields and under conditions which are thermally more satisfactory than those which exist in the prior art. It is also an object to provide a cyclic process in which a fixative mass is prepared and regenerated and used again, the cyclic process, and the fixative mass all being novel. It is also an object to provide a process which separates the liberation of the ammonia from the liberation of the acid.

The objects of the invention are accomplished generally speaking by a method for the preparation of ammonia and hydrochloric acid from ammonium chloride which comprises preparing a fixative mass having partly reduced iron oxide and an alkali metal chloride as essential constituents, putting ammonium chloride into contact with said mass at a temperature favorable to the release of ammonia, recovering the ammonia, reacting the iron in the fixative mass with an oxidizing gas and water vapor at a temperature favorable to the reaction, thereby releasing hydrochloric acid, and recovering the hydrochloric acid.

According to the invention the ammonia and hydrochloric acid are prepared from ammonium chloride according to a cyclic process which includes the steps of putting ammonium chloride into contact with a solid fixative mass, the essential ingredients of which are partially reduced iron oxide and alkali metal chloride. The chlorine ion of ammonium chloride is fixed on the fixative mass and the ammonia is released with water vapor. The chlorinated, fixative mass is then oxidized by a gaseous oxidizing agent. The chlorine ion fixed on the fixative mass is liberated by water vapor as hydrochloric acid, which is sepaarted out, and the iron oxides of the fixative mass are reduced to their initial state of partial reduction by means of a reducing gas such as hydrogen or carbon monoxide.

If we regard $Fe_2O_3$ as fully oxidized and Fe as completely reduced it will be apparent that a partially reduced iron oxide is one which has a valence less than ferric but which has some degree of oxidation. A medium state of oxidation is preferred, especially between valences 2 and 3, advantageously approximating that of magnetite $Fe_3O_4$. The novel process may be represented by the following four reactions:

(A) In the first reaction FeO is reacted with the chlorine of ammonium chloride:

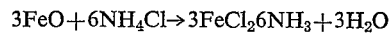
$$3FeO + 6NH_4Cl \rightarrow 3FeCl_2 6NH_3 + 3H_2O$$

(B) In the second reaction the compositions formed in the first step are oxidized to the ferric state:

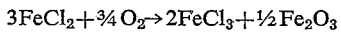
$$3FeCl_2 + \tfrac{3}{4}O_2 \rightarrow 2FeCl_3 + \tfrac{1}{2}Fe_2O_3$$

(C) In the third reaction the oxidized compositions react with water vapor:

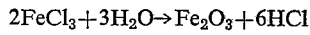
$$2FeCl_3 + 3H_2O \rightarrow Fe_2O_3 + 6HCl$$

(D) In the fourth reaction the ferric oxides are reduced:

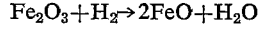
$$Fe_2O_3 + H_2 \rightarrow 2FeO + H_2O$$

Among the alkali metal chlorides which are satisfactory are sodium and potassium chlorides, of which potassium chloride yields the most satisfactory results. It is advantageous to include the potassium chloride in the fixative mass in quantities such that the molar ratio of it to ammonium chloride is between 0.1 and 1 and preferably between 0.3 and 0.7.

It is advantageous to include about 8 to about 12% by weight of MgO in the fixative mass, the percentage being based upon the weight of the metallic iron present in the mass. It has been established that the magnesia, when included in these proportions, increases the speed with which ammonia and hydrochloric acid are liberated.

It is also advantageous, in many cases, to include solid inert substances in the fixative mass to act as diluents or supports for the reagents and the reaction. Silica and alumina are exemplary of these substances and have a particular effect of accumulating heat, lending thermal balance to the reaction cycle. This makes it advantageous to use certain ores in their native state, for example bauxite, which contains partially reduced iron oxide as well as substantial quantities of inert materials such as alumina which are of service during the reactions.

The fixative materials may be prepared in different ways, for example by mixing ferric oxide with other solid constituents such as the alkali metal chlorides and inert fillers, the ferric oxide being partially reduced by means of a reducing gas, of which hydrogen and carbon monoxide are exemplary. It is equally possible to deposit ferric oxide on particles of an inert support (filler) from a solution of ferrous salts containing metallic iron into which an oxidizing agent such as air is admitted. After adding other constituents of the fixative mass the iron oxides can be partially reduced as desired. It is also possible to make up the fixative mass from iron chlorides, for instance by impregnating the particles of an inert substance with a solution of iron chloride, this mass being thereafter treated, by drying it, and adding the other necessary constituents. After oxidation of the iron compounds to a superior valence by means of water vapor (in order to release hydrochloric acid from the iron chloride), it is possible to partially reduce the mass by reducing gases. It will thus be seen that the process can be started in any one of its steps regardless of the degree of oxidation of the iron.

The fixative masses of this invention may be used in any appropriate physical form, for example as powders or in larger granules.

In the first step of the process the fixative mass is put in contact with ammonium chloride, preferably in quantities such that the molar ratio of ammonium chloride to iron oxide present in the mass in the ferrous state is between 0.5 and 2. The contact between the ammonium chloride and the fixative mass can be accomplished in several ways, for example by depositing solid ammonium chloride on, or mixing it with the fixative mass, and heating the whole to 400°–450° C. It is equally possible to put the fixative mass, while hot from the reduction step, into contact with solid ammonium chloride or with ammonium chloride which has been partially or totally sublimed, the ammonium chloride being thereby more or less dissociated into hydrochloric acid and ammonia vapors. When operating according to the last method, the thermal balance of the cycle is controlled more easily, as the preliminary sublimation of the ammonium chloride makes it easy to adjust the temperature of the reaction medium at the level desired.

In the course of the first step the chlorine ion of the ammonium chloride is fixed on the fixative mass, the ammonia and water being liberated. As the ammonia is released it is recovered in quantities which are substantially stoichiometric with respect to the ammonium chloride put into the process. It is also possible to entrain the ammonia and the water vapor that is liberated in an inert gas, such as nitrogen, during the operation, or with a reducing gas such as hydrogen or illuminating gas.

In the second step of the process the partially reduced compositions in the chlorinated fixative mass are oxidized to the ferric state by means of gaseous oxidizing agents such as oxygen or gaseous mixtures having an oxygen base. This oxidation also has the effect of heating the fixative mass to 500°–550° C., a temperature which is favorable to the liberation of hydrochloric acid in a later step. The end of the oxidation process can be determined by any known means, for instance by registering the temperature gradient or by measuring the oxygen remaining in the gases which leave the reaction mass. In practice it is easier to stop the treatment before oxidation is wholly completed and to begin the third step of the reaction cycle as soon as traces of chlorine appear in the effluent.

In the third step of the process the chlorine ion, which is attached to the chlorinated and oxidized fixative mass as hydrochloric acid, is set free by contact of the mass with water vapor. It has been established that during this operation it is advantageous to introduce moderate quantities of the gaseous oxidizing agent, e.g. air, in about 10% by volume. The simultaneous treatment of the chlorinated fixative mass by a gas containing water vapor and oxygen substantially increases the speed at which the hydrochloric acid is liberated.

In the fourth step of the process the iron oxides in the fixative mass are reduced by passing a reducing gas through them in such quantity as to return the oxides to substantially the same state of valence as that which they had in the beginning. This is achieved at a temperature which may advantageously be between 500° and 550° C. and is preferably about 500°–520° C. During this operation it is useful to burn a part of the reducing gas in contact with the fixative mass by means of an oxidizing gas so as to generate heat within the fixative mass and thus to facilitate the overall thermal balance of the complete cycle. The fixative mass being thus regenerated can be returned to the process with a new quantity of ammonium chloride to complete another cycle.

At the beginning of the operation with a new mass the process is initiated at that step which is indicated by the existing constitution of the fixative mass. Thus, when the operation is begun with a fixative mass which has been prepared from previously reduced iron oxides the cycle is started with the first operation described above, which is to put the mass in contact with the ammonium chloride. If, on the other hand, one begins the operation with a fixative mass containing ferric chloride, the process will begin with the liberation of hydrochloric acid, proceeding then stepwise through the cycle. Further, if one begins the operation with a fixative mass prepared from ferric oxide, the cycle will be started by a partial reduction of the iron oxide before mixing the fixative mass with ammonium chloride.

At the start of the cycle there is no inconvenience in retaining a few percent of chlorine ions on the fixative mass as ammonium chloride. These ions remain fixed on the mass and during the succeeding cycle practically the whole of the hydrochloric acid imported by the ammonium chloride will be recovered.

In the following examples bauxite has been chosen as the base material for the fixative mass because it includes the indispensable iron oxides and inert solids under the form of alumina. These examples are illustrative and do not limit the generality of what is elsewhere herein stated.

Example 1

A fixative mass was prepared by mixing 150 g. of ferriferous bauxite containing 39.9% of iron, which had been calcined at 800° C. with 24 g. of potassium chloride and 5 g. of magnesia. This mixture is treated in about an hour by a quantity of illuminating gas on the order of 10 l., the solid mass being maintained at 500°–520° C. The iron oxides present after the reduction were at a stage of valence corresponding to about that of magnetite. 27 g. of ammonium chloride were placed under this mass and a light current of nitrogen was passed through it. The fixative mass was kept at 400°–420° C. and discharged 8.5 g. of ammonia in 45 minutes, a 99% yield of the quantity present as ammonium chloride. When the release of ammonia ended a current of air was passed through the chlorinated mass at 10 l./hr. The temperature of the mass attaining 500–520° C. at the end of the oxidation. At the end of about 50 minutes a light release of chlorine was observed and the flow of air was reduced to 3.5 to 4 l./hr. while introducing a current of water vapor at 44 l./hr. At the end of 45 minutes, 17.5 g. of hydrochloric acid had been recovered, a 95% yield of that which was imported by the ammonium chloride. The fixative mass was regenerated by passing 10 l./hr. of illuminating gas through it at 500°–520° C.

Example 2

The regenerated mass from Example 1 received 27 g. of ammonium chloride and the conditions of Example 1 were repeated. In 45 minutes 8.5 g. of ammonia a 99% yield, were recovered. After oxidation of the chlorinated mass there were recovered in one hour 94% of hydrochloric acid and in 1 hour 50 minutes 99.5% to 100% of the hydrochloric acid imported by the ammonium chloride.

Example 3

The series of operations described in Example 2 was repeated thirteen times. At the thirteenth recycling of the fixative mass there were recovered 99.5% of ammonia in 50 minutes and in 60 minutes 92% of hydrochloric acid imported by the ammonium chloride.

Example 4

A fixative mass was prepared by calcining 150 g. of bauxite containing 39.9% of iron at 800° C. and mixing the calcined bauxite with 24 g. of potassium chloride. After reducing the fixative mass with illuminating gas it was put in contact with 27 g. of ammonium chloride. After 70 minutes of treatment 8.42 g. of ammonia, a 98.1% yield, were recovered. The mass was oxidized by means of air and 37 l./hr. of water vapor and 3.5 to 4 l./hr. of air were passed through it. After 60 minutes of this treatment 15.7 g. of hydrochloric acid, an 85% yield, were recovered.

Example 5

A fixative mass was prepared as in Example 1 and after partial reduction of the oxides of iron it was put in contact with 27 g. of ammonium chloride, the whole being maintained at 400° to 420° C. and yielding 8.5 g. of ammonia in 45 minutes, a 99% yield of the ammonia imported by the ammonium chloride. Afterward, the chlorinated mass was heated to 500°–520° C. by means of a current of air introduced at a rate of 10 l./hr. After an hour of this treatment, there was a slight release of chlorine and the air current was cut off. A current of 37 l./hr. of water vapor were then passed on to the oxidized mass and after 60 minutes of this treatment 12.3 g. of hydrochloric acid were recovered, a 67% yield.

The advantages of the invention, compared to the prior art, are many. It recovers the ammonia and hydrochloric acid of ammonium chloride in practically stoichiometric yields. The stages of the process are simple and the thermal balance of the reaction cycle is established and maintained by direct heating of the fixative mass. A particular advantage is that the speeds of liberation of ammonia and hydrochloric acid are relatively high and that practically all of the ammonia is released and recovered before the hydrochloric acid begins to be released.

It will be perceived that the invention achieves a cyclic process of preparing ammonia and hydrochloric acid from ammonium chloride by putting the ammonium chloride in contact with a fixative mass which is constituted in its essential elements by a partially reduced iron oxide and at least one alkali metal chloride; that the chlorine ion is fixed on the mass while the ammonia is released with water vapor; that the chlorinated mass is then oxidized by means of a gas containing oxygen and the chlorine is liberated as hydrochloric acid by means of water vapor; and that after the hydrochloric acid has been recovered the oxides of the fixative means are partially reduced to their original state by a reducing gas. It will also be apparent that the thermal balance of the entire process is established and maintained with ease.

As many apparently widely different embodiments of the present invention may be made without departing from the spirit and scope thereof, it is to be understood that the invention is not limited to the specific embodiments.

What is claimed is:

1. The method of preparing ammonia and hydrochloric acid from ammonium chloride comprising preparing a fixative mass having as essential ingredients, partly reduced iron oxide and an alkali metal chloride, reacting said ammonium chloride with said fixative mass at a temperature of about 400°–450° C. thereby releasing ammonia recovering $NH_3$, reacting the iron in the fixative mass with an oxidizing gas, reacting the oxidized mass with water vapor at a temperature of about 500° to 550° C., thereby releasing hydrogen chloride, and recovering hydrogen chloride.

2. The method of claim 1, and after release of the hydrochloric acid, regenerating the fixative mass by reduction of the iron to a valence and state of oxidation substantially less than ferric by contacting the same with a reducing gas.

3. A method according to claim 1 in which the molecular ratio of ammonium chloride to ferrous iron oxide in the fixative mass is between 0.5 and 2, and the reaction temperature is between about 400° and about 450° C.

4. A method according to claim 1 in which the ammonium chloride is at least partially sublimed before the reaction.

5. The method of claim 1, the ammonia being recovered by flowing a current of inert gas through the reactive mass.

6. The method of claim 1, the fixative mass being oxidized after release of ammonia, by flowing therethrough an oxidizing gas, at a temperature of about 500°–550° C.

7. The method of claim 2, said regeneration of the fixative mass being effected at about 500° to 550° C.

8. A method according to claim 7 in which a part of the reducing gas is burned by an oxidizing gas in contact with the fixative mass whereby to establish and maintain the thermal equilibrium of the reaction.

9. The method of claim 1, the fixative mass containing about 8 to about 12% by amount of magnesium oxide, based on the weight of iron in the mass.

10. The method of claim 1, including as a first step reacting FeO with $NH_4Cl$ to produce $FeCl_2$ and $NH_3$; as a second step reacting the $FeCl_2$ with $O_2$ to produce $FeCl_3$ and $Fe_2O_3$; as a third step reacting the product with $H_2O$ to produce $Fe_2O_3$ and HCl; and as a fourth step reducing the iron oxide $Fe_2O_3$ to such partly reduced state and adapting it to further reaction with $NH_4Cl$.

11. The method of claim 1, the aggregate composition of the partly reduced iron oxide of the fixative mass being substantially the same as that of magnetite, $Fe_3O_4$.

12. The method according to claim 1 in which the molar ratio of alkali metal chloride to ammonium chloride is from 0.1 to 1 for KCl.

13. The method of claim 1, the fixative mass containing about 8–12% of MgO, based on the weight of metallic iron in the mass.

14. The method of claim 10, and using the FeO for reaction with additional ammonium chloride in a new series of first, second, third and fourth steps, as aforesaid.

15. The method of claim 1, the hydrogen chloride being released from the oxidized fixative mass by a mixture of water vapor and oxygen.

References Cited

UNITED STATES PATENTS

| | | | |
|---|---|---|---|
| 379,488 | 3/1888 | Mond | 23—193 |
| 1,718,420 | 6/1929 | Kessler | 23—154 |
| 2,206,399 | 7/1940 | Grosvenor et al. | 23—219 |
| 2,418,931 | 4/1947 | Gorin | 23—219 |
| 2,735,749 | 2/1956 | Prutton et al. | 23—193 XR |
| 2,787,524 | 4/1957 | Claflin | 23—154 |
| 3,324,046 | 6/1967 | Di Prose | 23—154 XR |

EDWARD STERN, Primary Examiner

U.S. Cl. X.R.

23—87, 113, 200; 252—182